United States Patent
Koo et al.

[11] Patent Number: 5,979,249
[45] Date of Patent: Nov. 9, 1999

[54] ACTUATOR RESONANCE TESTER FOR A DISK DRIVE

[75] Inventors: Ja Choon Koo, Santa Clara; Tu Nguyen; Wilson Long, both of San Jose, all of Calif.

[73] Assignee: Samsung Electronics Co., Ltd., Suwon, Rep. of Korea

[21] Appl. No.: 09/093,936

[22] Filed: Jun. 9, 1998

[51] Int. Cl.[6] .................................................. G11B 5/00
[52] U.S. Cl. ................... 73/862.541; 360/75; 360/77.04
[58] Field of Search .............................. 73/862.544, 1.15, 73/1.56, 579; 360/104, 106, 109, 105, 69, 75, 78.07, 78.08, 78.09, 77.04, 77.02

[56] References Cited

U.S. PATENT DOCUMENTS

| | | | |
|---|---|---|---|
| 4,040,103 | 8/1977 | White | 360/75 |
| 5,130,871 | 7/1992 | Whitmore | 360/104 |
| 5,299,075 | 3/1994 | Hanks | 360/75 |
| 5,476,015 | 12/1995 | Valent | 73/862.541 |
| 5,488,240 | 1/1996 | Hlousek et al. | 250/231.16 |
| 5,521,772 | 5/1996 | Lee et al. | 360/75 |
| 5,663,847 | 9/1997 | Abramovitch | 360/75 |

*Primary Examiner*—Hezron Williams
*Assistant Examiner*—Helen C. Kwok
*Attorney, Agent, or Firm*—Jones Volentine, L.L.P.

[57] ABSTRACT

An actuator resonance tester is provided for testing the resonance of an actuator arm in a hard disk drive device. The tester includes an actuator arm, a pivot, one or more weights, a voice coil, a voice coil motor, an accelerometer, and a processor. The one or more weights are formed on the actuator arm to simulate the mass of at least one read/write head. The base and the test housing are affixed to either end of the pivot to provide it with proper boundary conditions to simulate the boundary conditions of a fully-assembled hard disk drive device. The voice coil and the voice coil motor move the actuator arm rotationally around the pivot. The accelerometer is placed on the actuator arm to measure the horizontal acceleration of the actuator arm. The processor determines the resonance of the actuator arm based on the arm's measured horizontal acceleration. In this way, the resonance of the actuator arm can be tested without the need to construct the entire hard disk drive device.

9 Claims, 4 Drawing Sheets

ACTUATOR RESONANCE TESTER FOR A DISK DRIVE

BACKGROUND OF THE INVENTION

1. Field of the Invention

The present invention relates to a resonance testing device and method for use in hard disk drive actuators. More particularly, the present invention relates to a resonance testing device using an accelerometer to determine the range of horizontal motion of a hard disk drive actuator during operational motion.

2. Description of the Related Art

Hard disk drive (HDD) storage devices currently store data on a magnetic hard disk drive by magnetically reading data to and writing data from a disk via a read/write head (r/w head) fixed to an actuator arm.

Alternatively, newer drives, called MR drives, write using magnetic physics which changes the magnetic field on the media. MR drives read by using the variation of electrical resistance of the r/w head. In this way, the electrical resistance of the MR r/w head is changed if it is located near the written data, i.e., variation in the magnetic field, on the media. As a result, by monitoring the variation of electrical resistance of the r/w head, it is possible to read the information written on the media. With a thin film head, the HDD measures the electrical current flow generated when the r/w head is located on the different magnetic field.

However, regardless of the type of drive, during operation the disk rotates about its axis, while the actuator arm moves the r/w head across the disk. The actuator arm moves the r/w head to different areas of the disk to allow the r/w head to read data from and write data to the disk. The disk itself is divided into a number of concentric tracks each having the same width. These tracks are in turn divided into a number of sectors. In seeking out a particular track, the actuator head moves in a radial direction from its current location to the location of the track in which the data sector it is seeking is located.

For the r/w head to operate properly, it should perform its function at a distance in the tens of microns above the surface of the hard disk. If the distance between the r/w head and the disk gets too small, if impurities form on the surface of the disk, or if the head moves too much in a vertical direction towards the disk, the r/w head can impact on the surface of the disk, causing damage to the head and the disk. This undesired collision is called a head crash.

In addition, for the r/w head to operate properly, it must also be moved to the desired track and sector of the disk within a narrow horizontal range as well. Too much horizontal displacement can cause the r/w head to be improperly aligned over the desired track and sector. A horizontal displacement of as little as 8 microns can cause the disk drive to fail to operate properly.

An inherent limitation in the read/write process is the fact that the actuator arm and the r/w head will oscillate slightly in a horizontal direction as they move back and forth. Since the r/w head must stay very small margin of horizontal movement when seeking a particular track, the oscillation must be kept to within a very small tolerance for the HDD to operate properly. Too much oscillation will result in the very real possibility of an improper alignment of the r/w head during a point of maximum oscillation, meaning a failure to read or write data properly.

FIG. 1 is a graph for showing the natural frequencies of an actuator arm structure. As shown in FIG. 1, the actuator arm has a gain of the actuator arm varies depending upon the frequency of its movement. Under ideal conditions, the gain is kept close to 0 dB so that the gain will be even and the actuator arm will move as directed. As FIG. 1 shows, however, the gain of the system rises dramatically near the natural, or modal, frequencies $f_{M1}$ and $f_{M2}$ (although only two natural frequencies are shown, there may be others as well). It is important to identify what these frequencies are so that they can be avoided in the operation of the actuator system.

One way that the graph of natural frequencies can be obtained is by performing a modal analysis using parameters for a tortional and bending mode. This will give an acceptable graph for determining a reasonable operating frequency for the tested actuator, but requires measurements of the actuator resonance.

Thus, it is very helpful to measure the actuator resonance for HDDs prior to sale or use of the HDD devices. The actuator resonance serves as a measurement of the horizontal motion of the actuator arm and r/w head assembly, and will help determine the likelihood that the head will be able to move to the desired track of the disk for the tested actuator. An indication of actuator resonance will help decrease failures in manufactured HDD devices, and can serve to increase the yield of an HDD manufacturing process. If the actuator resonance is measured prior to the operation of the HDD device, the danger of improper head alignment can be accurately identified and avoided. This can serve to enhance the reputation of the company using this testing scheme and thereby increase its financial success. As a result, although an effective actuator resonance test is not essential in and HDD manufacturing process, it is desirable.

In the past, the actuator resonance has been measured through the use of a laser-based testing system, comprising a laser Doppler vibrometer, a digital signal analyzer, a precise x-y-z fixture, and a high-fidelity power amplifier. An example of this conventional method is shown in "Drive Level Slider-Suspension Vibration Analysis And its Application to a Ramp-Load Magnetic Disk Drive," by Ta-Chang Fu, et al., IEEE Transactions on Magnetics, Vol. 31, No. 6, (November 1995), the contents of which are hereby incorporated by reference.

One disadvantage of this kind of a laser-based system is its high cost. Typically such a laser-based resonance tester costs $80,000 or more. This precludes many small parts suppliers from being able to afford to engage in actuator resonance testing.

In addition, to use the laser-based actuator resonance tester, it is necessary to have an operator with a certain level of knowledge about laser characteristics and laser operation. Such an operator must have sufficient expertise in the field of lasers to get a stable beam focus for the laser used in the system. This serves as a further barrier to the use of laser-based actuator resonance testers. It also serves to increase costs when laser-based system are indeed used. It also adds to the time and complexity of the testing process, since beam focusing is neither simple nor quick.

A laser based testing scheme also requires that a hole be drilled in each drive unit tested to allow the laser beam to shine on the relevant components. This hole must be drilled with a certain amount of precision, which further increases the complexity and cost of testing. Furthermore, the drilled hole serves to ruin the HDD device for any future use, again increasing the cost of testing.

A further disadvantage of conventional laser-based actuator resonance testers is that they require that the HDD head-disk assembly be fully constructed before it can be tested. If the HDD device is not fully assembled prior to testing, the weight balances will not be correct and the measured actuator resonance of the device will be inaccurate. For the testing to be accurate, the same boundary conditions must exist during testing as would exist in the final HDD device. Since both ends of the pivot in a manufactured HDD device are fixed, i.e., connected to the manufactured HDD device, they must both be fixed in the testing device. The way this is achieved in conventional testing methods is to fully assemble the HDD device prior to testing. Not only does this increase the cost and time required for such a test, but it precludes the actuator vendors from being able to make the tests prior to final assembly, since they do not have access to the assembled devices.

It is therefore desirable to provide an affordable actuator resonance tester for a disk drive that can be operated without a great deal of specialized knowledge and prior to final assembly of the disk drive.

SUMMARY OF THE INVENTION

It is thus an object of the present invention to overcome or at least minimize the various drawbacks associated with conventional techniques for determining the actuator resonance for an HDD device.

In particular, it is an object of this invention to provide an actuator resonance testing device and method that avoids the use of laser-based testing equipment.

It is a further object of this invention to provide an actuator resonance testing device and method that can be used even on an actuator that is not part of a fully-assembled HDD device.

To achieve these and other advantages, and in accordance with the purposes of the invention, as embodied and broadly described, the invention provides for an actuator resonance tester for a disk drive, comprising: an actuator arm movable in a horizontal direction, an accelerometer attached to the actuator arm for measuring the horizontal acceleration of the actuator arm, and a processor for determining the resonance of the actuator arm based on the horizontal acceleration measured by the accelerometer.

The actuator resonance tester may further comprise a voice coil and a voice coil motor, wherein the voice coil and the voice coil motor operate to move the actuator arm in the horizontal direction. The actuator resonance tester for a disk drive may also comprise a pivot around which the actuator arm moves in a rotational direction. The actuator resonance tester for a disk drive may also comprise one or more weights formed on the end of the actuator arm to simulate the mass of the hard disk drive heads.

The actuator resonance tester may also comprise a base attached to a first end of the pivot, and a test housing attached to the base and to a second end of the pivot. The base may be formed of a material heavy enough to dampen ambient vibrations in the resonance tester. The base and the test housing may also bee chosen to provide the pivot with proper boundary conditions to simulate true boundary conditions of a fully-assembled hard disk drive device.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENTS

A simple and affordable actuator resonance tester has been provided for testing the actuator resonance for a disk drive, even when assembly of the disk drive has not been completed.

Figure 1:
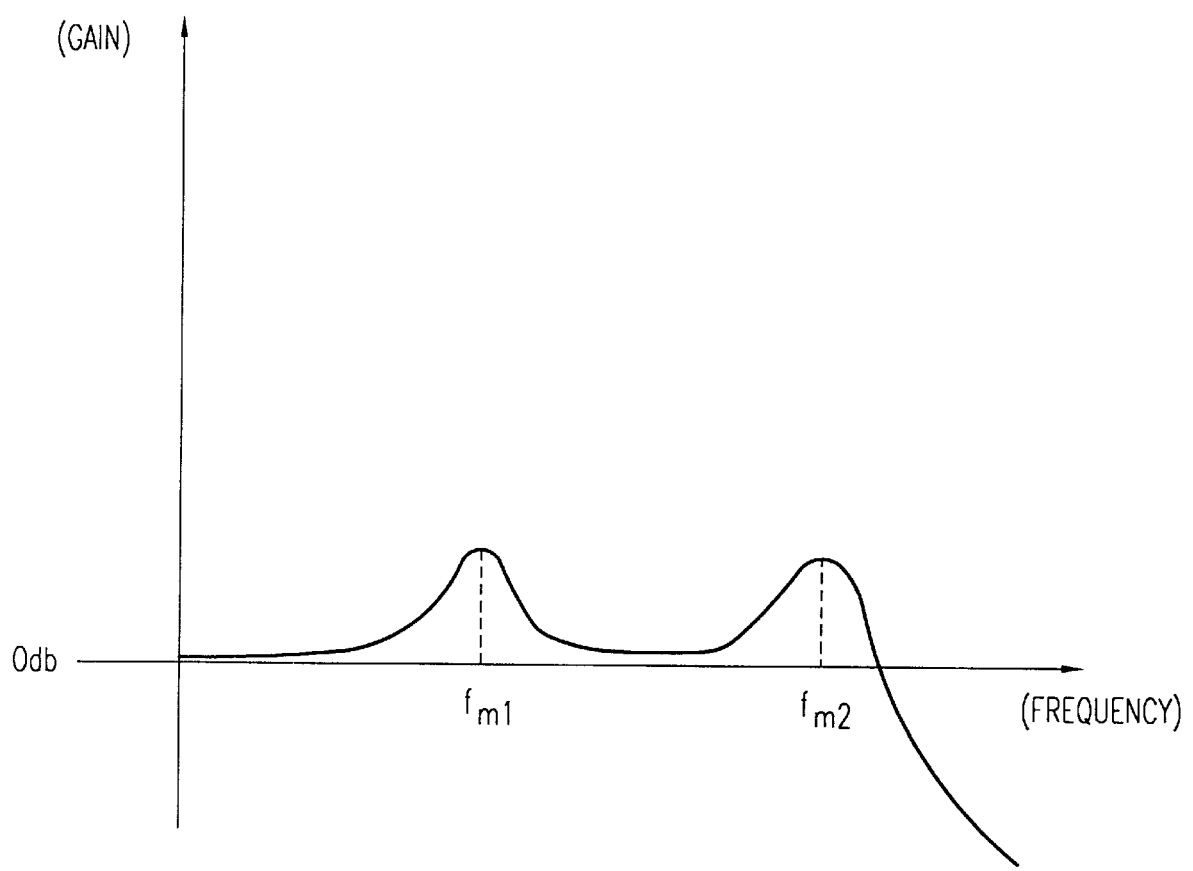
FIG. 1 is a graph for showing the natural frequencies of an actuator arm structure.
Figure 2:
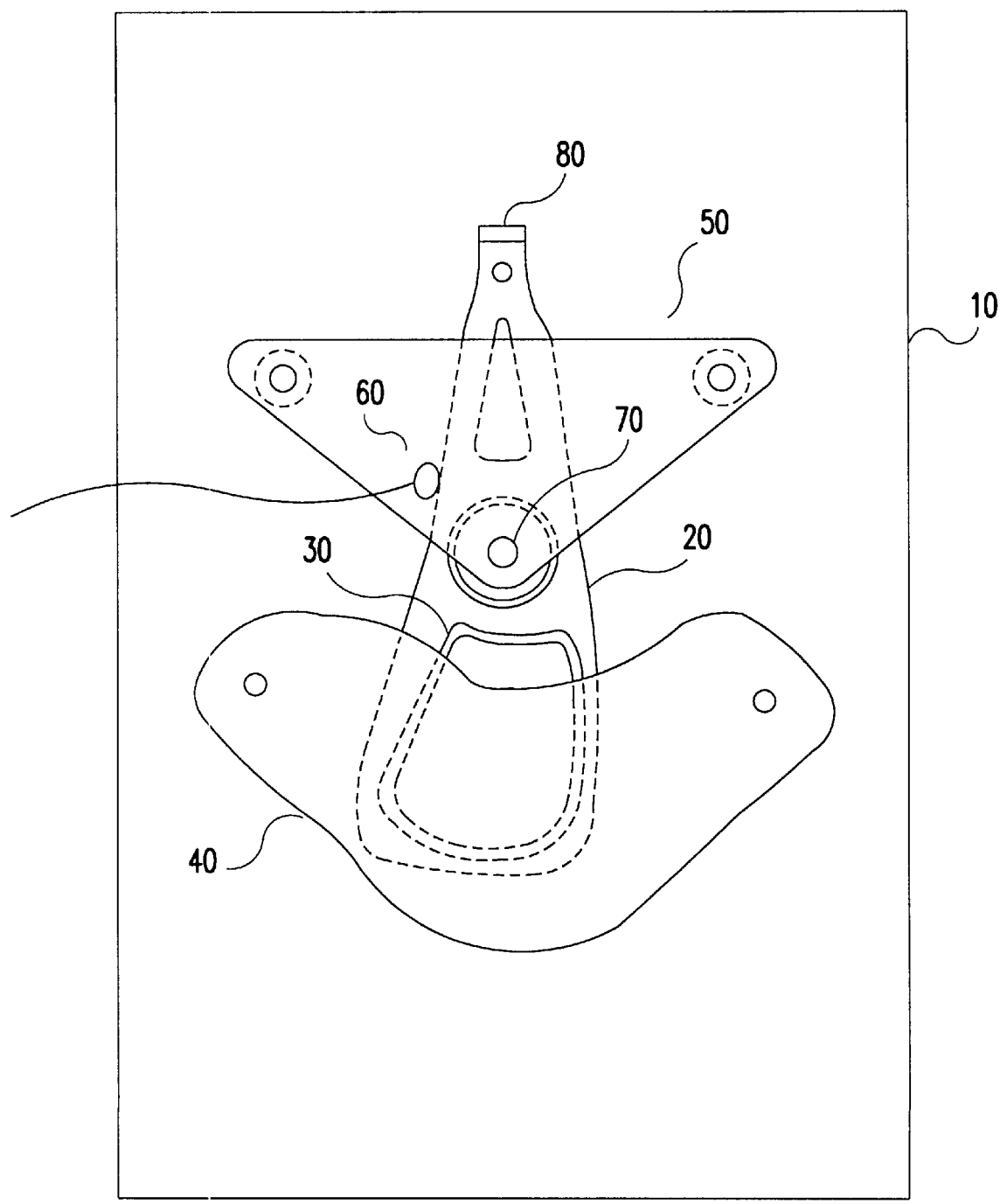
FIG. 2 is an overhead view of a test station for an actuator resonance tester according to a preferred embodiment of the present invention.
Figure 3:
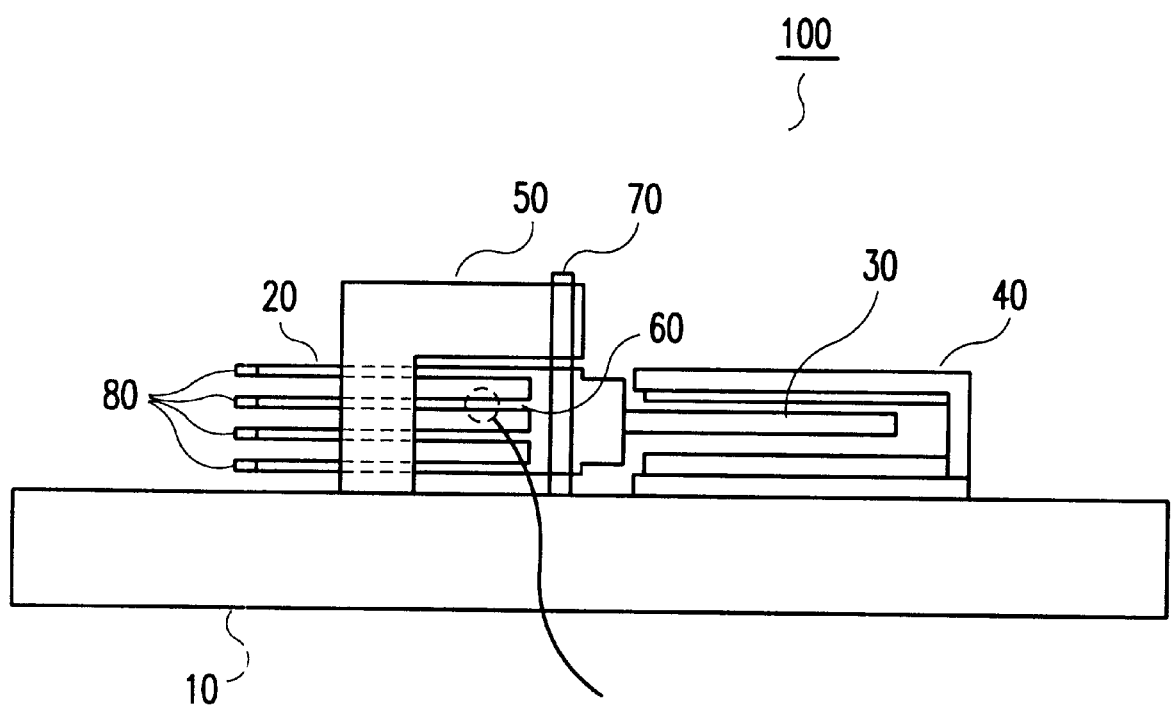
FIG. 3 is a side view of the test station shown in FIG. 2.

FIG. 2 is an overhead view of a test station for an actuator resonance tester according to a preferred embodiment of the present invention, and FIG. 3 is a side view of the test station shown in FIG. 2. As shown in FIGS. 2 and 3, the test station 100 includes a base 10, an actuator or actuator arm 20, a voice coil 30, a voice coil motor 40, a test housing 50, an accelerometer 60, a pivot 70, and a plurality of head weights 80.

The base 10 and the test housing 50 are designed to simulate the boundary conditions of a fully-assembled HDD device. This is accomplished by performing a finite element analysis, or finite element method (FEM), on the fully-assembled HDD device to determine the proper mass and geometry for the housing 50. The base 10 is chosen to be of a heavy material to counter vibrational interference.

The actuator arm 20 is attached to the base 10 via the pivot 70. The voice coil 30 is formed on the actuator arm 20 and is controlled by the voice coil motor 40. Based on the operation of the voice coil motor 40, the voice coil 30 will move the actuator arm 20 rotationally back and forth around the pivot 70 within a limited arc of motion.

Because of the tolerances of the system, as the actuator pivots horizontally around the pivot 70, it will also have a certain amount of inherent horizontal motion as well. The amount of motion will be greatest at the end of the actuator arm 20 where the r/w heads will be attached. In particular, the actuator is attached to a suspension, which is in turn attached to the r/w heads. As noted above, the range of this horizontal motion must be kept below a very tight tolerance to avoid the problem of improper head alignment.

In the preferred embodiment shown in FIGS. 2 and 3, an accelerometer 60 is placed on the actuator arm 20 to measure the horizontal motion. This accelerometer is oriented to measure only horizontal motion, and is preferably chosen to be as small as possible to minimize its effect on the actuator resonance. The accelerometer used in the preferred embodiment is a ENDEVICO Model 22 PICOMIN piezoelectric accelerometer.

The system carries out the testing process without complete assembly of the HDD device. In order to simulate the actual operation of the HDD with the proper distribution of weight, the plurality of head weights 80 are attached to the ends of the actuator arm 20. This is also the reason that the accelerometer 60 is chosen to be as small as possible. The weight of the accelerometer 60 will influence the operation of the actuator arm 20, but if it is small enough, this influence can be neglected.

In the laser-based test, the testing focuses on the actual heads, to determine their movement. Since there are no heads in the testing device of the current invention, a different area of focus must be determined for the accelerometer. This is accomplished by performing a finite element method analysis on the actuator arm 20 to determine the best point on the actuator arm 20 to approximate head motion. Once this optimal point is determined, a proper correction factor is determined using the fine element method so that head motion can be accurately approximated.

Figure 4:
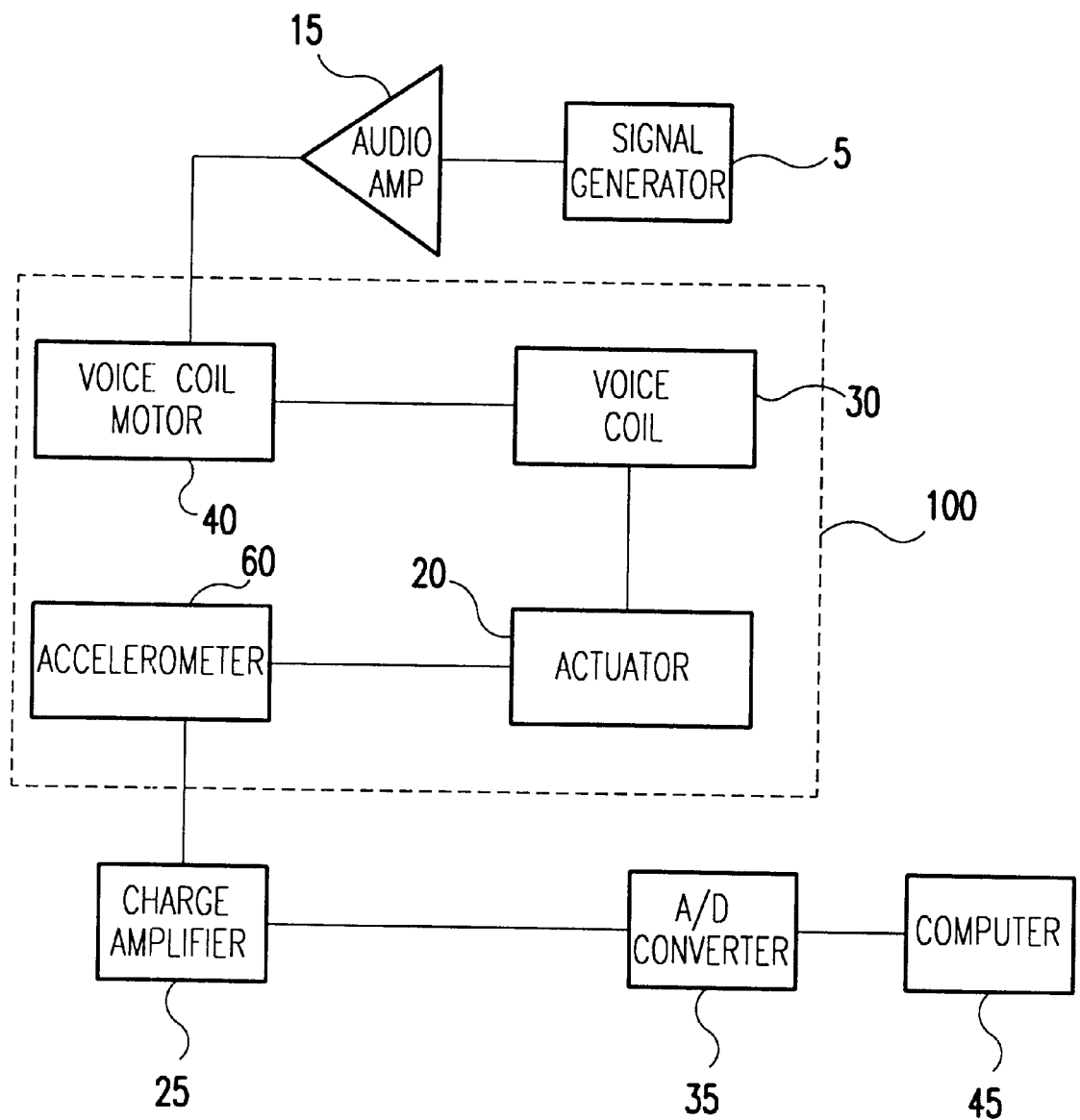
FIG. 4 is a block diagram of the actuator resonance tester according to a preferred embodiment of the present invention.

The actual control of the actuator resonance tester is described below with reference to FIG. 4, which is a block diagram of the actuator resonance tester according to a preferred embodiment of the present invention. As shown in FIG. 4, the voice coil motor 40 receives a control signal from a signal generator 5, via an audio amplifier 15. The voice coil motor 40 then moves the voice coil 30, which is attached to the actuator arm 20, thereby moving the actuator in both an intentional horizontal direction, and an unintentional vertical direction. The accelerometer 60 then detects the horizontal motion and sends a signal to a computer 45 via a charge amplifying device 25 and an A/D converting device 35.

The signal generator 5 and the audio amplifier 15 provide signals to the voice coil motor 40 to horizontally move the actuator arm 20 attached to the voice coil 30. These signals are preferably comparable to signals that would be used during normal operation, so that the resultant measurements are a good indication of how the HDD device would operate under normal conditions.

In this design, the signal generator 5 and the computer 45 can be the same unit. In this case, a sound card on the computer 45 can perform the function of the signal generator 5. In addition, the function of the A/D converting device 35 can be either performed by a separate A/D converter or by a sound card on the computer 45. If cost is a primary concern, then a sound card is preferable for the A/D converting device, since a sound card is significantly cheaper than an A/D converter of sufficient quality.

As the actuator arm 20 moves laterally based on the signals supplied by the signal generator 5 and audio amplifier 15, the accelerometer 60 will measure the horizontal motion of the actuator arm 20. The accelerometer 60 supplies a signal indicative of the horizontal motion of the actuator arm 20 to a computer 45 via the charge amplifiing device 25 and the A/D converting device 35.

The computer 45 in turn processes the signal by performing a fast Fourier transform (FFT) on it. Preferably this is done with commercially available FFT analysis software, although other means of processing the data may be used.

By using a computer to analyze the data from the accelerometer, the system avoids the need for a digital signal analyzer that may cost upwards of $30,000. In contrast, the computer could cost in the range of $1000–2000.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

What is claimed is:

1. An actuator resonance tester for a disk drive, comprising:

an actuator arm movable in a horizontal direction;

an accelerometer attached to the actuator arm for measuring a horizontal acceleration of the actuator arm;

a processor for determining the resonance of the actuator arm based on the horizontal acceleration measured by the accelerometer.

2. An actuator resonance tester for a disk drive, as recited in claim 1, further comprising:

a voice coil; and a voice coil motor, wherein the voice coil and the voice coil motor operate to move the actuator arm in the horizontal direction.

3. An actuator resonance tester for a disk drive, as recited in claim 1, further comprising a pivot around which the actuator arm moves in a rotational direction.

4. An actuator resonance tester for a disk drive, as recited in claim 3, further comprising:

a base attached to a first end of the pivot; and a test housing attached to the base and to a second end of the pivot.

5. An actuator resonance tester for a disk drive, as recited in claim 4, wherein the base is formed of a material heavy enough to dampen ambient vibrations in the resonance tester.

6. An actuator resonance tester for a disk drive, as recited in claim 5, wherein the base and the test housing are chosen to provide the pivot with proper boundary conditions to simulate true boundary conditions of a fully-assembled hard disk drive device.

7. An actuator resonance tester for a disk drive,, as recited in claim 1, wherein the processor determines the resonance of the actuator arm using a fast Fourier transform.

8. An actuator resonance tester for a disk drive, as recited in claim 1, further comprising one or more weights formed on the end of the actuator arm to simulate the mass of hard disk drive heads.

9. An actuator resonance tester for a disk drive, as recited in claim 1, wherein the accelerometer is a piezoelectric accelerometer.

* * * * *